United States Patent Office 3,408,971
Patented Nov. 5, 1968

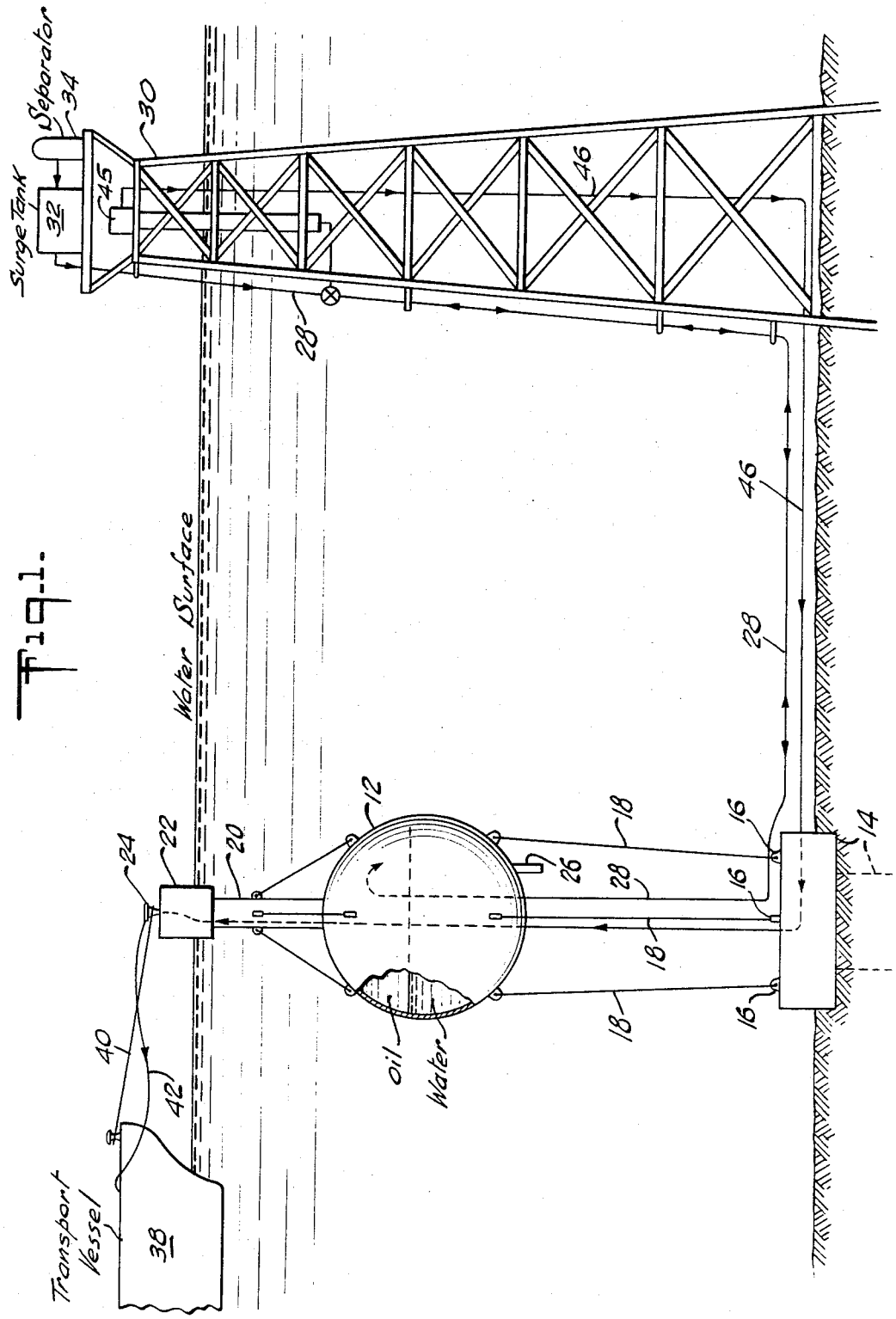

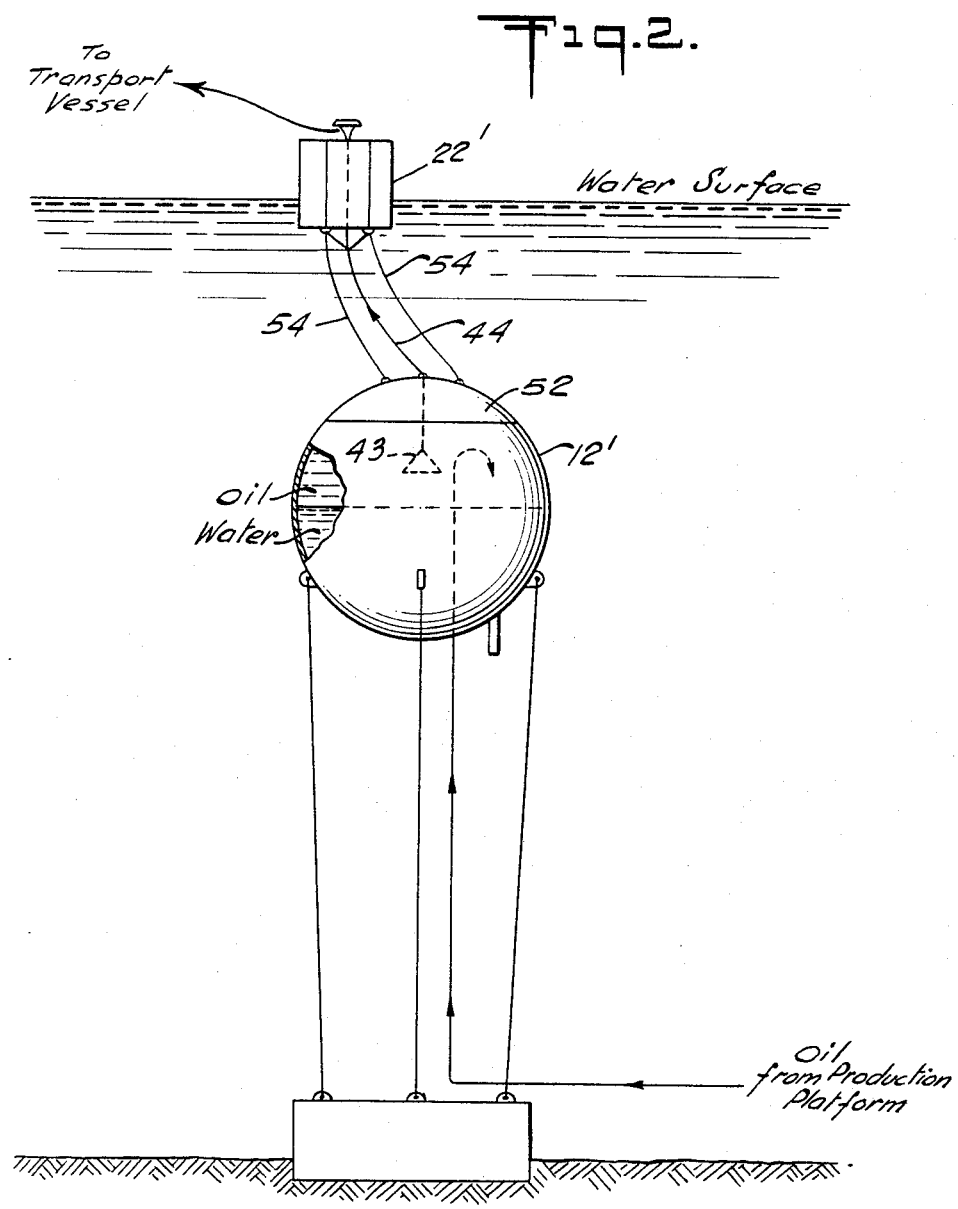

3,408,971
SUBMERGED OIL STORAGE VESSEL AND OIL LOADING FACILITY FOR OFFSHORE WELLS
George E. Mott, Metairie, La., assignor to Texaco Inc., New York, N.Y., a corporation of Delaware
Filed July 22, 1965, Ser. No. 474,117
7 Claims. (Cl. 114—.5)

ABSTRACT OF THE DISCLOSURE

Submerged storage with associated surface oil loading facility for water-immiscible liquids having a lighter density than water, comprising a buoyant storage vessel moored at an intermediate depth in the water with discharge means connected to a floating buoy at the surface.

---

This invention relates to submerged storage vessels for liquids having specific gravity less than the liquid in which they are immersed and being immiscible therewith. More particularly, the invention is concerned with a combination of a submerged oil storage vessel and oil loading facility for offshore wells.

When oil is discovered at offshore locations several years of development drilling may be required to justify installing a pipeline from the field to shore. During this period, wells are often times shut-in because of the lack of adequate storage facilities on the platform. One means for overcoming the above has been to maintain a tanker or transport barge at the location until it is filled and thereby transporting the oil to the desired destination. However, such an operation is faced with various problems, probably, the most important of which is the expense of tying up a tanker or barge for the requisite time to produce a full load. It will be appreciated that a floating barge or vessel is subject to storm conditions during loading and also presents a threat to the producing platform because of the possibility of collision therewith.

In view of the above disadvantages of tankers or barges, various floating type offshore storage vessels have been suggested as well as storage vessels which are submergible to the ocean floor. The floating type storage vessel, although dissipating considerable wave force by moving within the scope of the mooring, is subjected to the highest forces of the waves. The wave forces decrease with depth. Also, the floating storage units must resist wind loads which are generally from the same direction as the waves. The storage vessel located on the ocean bottom must be anchored rigidly to the ocean floor to stay in place and not scrape along the ocean bottom. Accordingly, a bottom located storage vessel, since it is not free to move, must withstand the full force of any waves encountered.

Accordingly, it is a principal object of the present invention to provide an offshore storage vessel which overcomes the above noted disadvantages by being moored at a depth below the surface wave action where the wave force is considerably less than at the surface and being permitted to oscillate to reduce the amount of force transmitted to the anchoring system.

It is a further object of the present invention to provide an offshore storage facility and unloading facility located away from the drilling platform a sufficient distance to minimize the possibility of damage to the rig by tankers or barges being loaded.

It is a further object of the present invention to provide an offshore storage and loading facility in which transporting barges can be loaded in relatively rough seas.

It is another object of the present invention to provide an offshore storage and loading facility which can be floated and moved to a new site.

It is a further object of the present invention to provide an offshore submerged storage facility and loading facility which does not require a fixed mooring for the barge or tanker to be loaded and provides and allows the tanker or barge to be continually maneuvered into the wind over a complete 360° rotation with respect to the loading facility during loading.

The objects of the invention are achieved by a submerged storage means for storing liquids having a density less than the liquid in which it is submerged and being substantially immiscible therewith. The storage means comprises a storage vessel and a mooring means for preventing the storage vessel from rising above a predetermined depth. Buoyancy means are associated with the storage vessel so as to maintain an upward force on the storage vessel and keep tension on the mooring means to maintain the storage vessel at the predetermined depth. The storage vessel contains a port near the bottom thereof which allows the free passage therethrough of the liquid in which it is submerged. Means are provided for inserting into the vessel the less dense liquid to be stored thereby displacing from the vessel through said port the liquid in which the vessel is submerged. Means are also provided for discharging the less dense stored liquid from the storage vessel thereby providing a corresponding inflow through the port of the liquid in which the vessel is immersed.

The objects of the invention are also achieved by a combination submerged storage means and transport vessel loading facility for storing liquids having a density less than the liquid in which it is submerged and being substantially immiscible therewith, comprising a storage vessel and a mooring means for preventing the storage vessel from rising above a predetermined depth. Buoyancy means are provided associated with the storage vessel to maintain an upward force on the storage thereby keeping tension on the mooring means to maintain the vessel at the predetermined depth. The storage vessel contains a port near the bottom thereof which provides for the passage therethrough of the liquid in which the storage vessel is submerged. Means are provided for inserting into the storage vessel the less dense liquid to be stored thereby displacing from said storage vessel through said port the liquid in which the storage vessel is submerged. Means are also provided for discharging the less dense stored liquid from the storage vessel thereby providing a corresponding inflow through the port of the liquid in which the vessel is submerged. A mooring buoy is provided floating on the surface of the liquid in which the storage vessel is submerged which is connected to said storage vessel by connecting means. A coupling means is located on the buoy for connecting the storage vessel discharge means to a transport vessel thereby completing a path for the transfer of the stored liquid to the transport vessel.

The above-mentioned and other features and objects of this invention and the manner of attaining them will become more apparent and the invention itself will be best understood, by reference to the following description and drawings wherein:

FIG. 1 is a schematic diagram of the submerged storage vessel, loading facility and production platform.

FIG. 2 is a schematic diagram of an alternative arrangement of the submerged oil storage vessel and the loading facility.

Referring to FIG. 1, there is shown a spherical storage vessel 12 located intermediate the water surface and the bottom. The operating location of the storage vessel 12 is sufficiently below the water surface so that it is below the most severe wave action which occurs near the surface of the water. The storage vessel 12 is depicted in FIG. 1 as being spherical, however, a cylindrical or an ellipsoidal shape may be more efficient in certain water depths under certain conditions. A cylindrical or ellipsoidal storage vessel might be maintained with the longitudinal axis either vertically or horizontally positioned in the body of water depending upon the design conditions.

At the site, where a storage vessel 12 is to be moored, a mooring weight or pile 14 is located on the ocean bottom. The mooring weight 14 can consist of a large heavy concrete block or concrete barge which rests on the bottom, or it can consist of a pile which is driven or grouted into the mud bottom. In any event, both types have secured therein connecting means 16 for securing lines thereto. The mooring lines 18 extend from the connectors 16 on the mooring weight 14 to suitable connecting means on the storage vessel 12. It can be seen that the mooring lines 18 are attached to the storage vessel at points which are symmetrical with respect to the vessel. It will be appreciated that more or even fewer mooring lines may be provided, the minimum being one. In this case, the tension of the mooring lines 18 is provided by a buoyant effect applied to the storage vessel 12. The buoyancy is provided by a buoyancy chamber 20 located near the top of the storage vessel 12. The buoyancy chamber 20 is of sufficient size that when immersed below the sea level it provides sufficient buoyancy to maintain at least the minimum desired tension in the mooring lines 18 under all conditions. The most severe condition from a buoyancy standpoint would be encountered when the storage vessel 12 is filled with sea water since the water is the densest liquid the vessel is to contain. Actually, the preferred shape of the buoyancy chamber is a cylindrical or cone shape to present as little surface area as possible to the increasing wave action in the upper wave zone. There are several advantages to having an elongated buoyancy chamber 20. For example, this buoyance chamber can control gradually the introduction or removal of the buoyant effect during lowering or raising of the storage vessel 12. This is accomplished by the gradual submerging or emerging of the buoyancy chamber 20 with respect to the water. Thus, as the storage vessel is lowered into the water the buoyancy increases as the buoyancy chamber submerges and vice versa. Providing the buoyancy chamber at the top, establishes a stabilizing effect on the storage vessel, since it will have less tendency to roll than if the buoyancy chamber, for instance, were located below the storage vessel.

FIG. 1 shows attached to the top of the buoyancy chamber 20 a mooring staple 22. The mooring staple 22 can be designed to provide all or part of the required buoyancy for the submerged storage vessel 12. The mooring staple 22 has mounted thereon a lubricated bearing circle which permits maneuvering of a transport vessel about the mooring when tied thereto and a swivel connector or coupling 24 projecting through the center of the bearing circle by means of which a hose connection between the transport vessel and the submerged storage vessel can be completed. The swivel connector can be of the well known Chicksan type.

The storage vessel 12 has a water suction and discharge opening or port 26 located at the bottom thereof so that the water in which the storage vessel is submerged can pass therethrough. Thus, it can be seen that as oil is removed from the storage vessel, the water rises therein until the vessel is full of water. A fill line 28 is provided which extends from a nearby production platform 30 and passes into the storage vessel 12 ending near the top of the inside of the vessel. As oil flows from the production platform through the fill line 28 it empties into the storage vessel 12 displacing the sea water therein. Since the density of the oil is less than the density of the water, it floats on the water surface thus filling the storage vessel with oil and forcing the water to pass out of the vessel through the water suction and discharge opening 26. The fill line 28 extends from a separator 34 and surge tank 32 on the production platform 30. The separator removes gas from the oil. The surge tank provides for release of additional gas at atmospheric pressure and is equipped with high and low level valves to continuously maintain a head of liquid on the fill line 28 as shown in FIG. 1. The liquid flows from the surge tank 32 to storage vessel 12 by gravity feed.

In order to transfer the oil from storage vessel 12 to a transport vessel 38, the transport vessel is secured to the lubricated bearing circle on mooring staple 22 by a mooring line 40. This line can be attached to the mooring staple 22 by personnel in a small boat. At the same time the hose 42 can be connected to the swivel type connector 24. The swivel type connector 24 allows a rotation of the oil loading hose 42 about the mooring staple 22 in accordance with any maneuvers of the transport vessel. The discharge arrangement shown in FIG. 1 for the stored oil in storage vessel 12 is utilized when the pumping action is provided at the production platform. In this case, the fill line 28 serves as both the fill line and as part of an oil discharge line from the storage vessel 12. A pump 45 is located on the production platform 30 which pumps the oil from the vessel 12 through the fill line 28 thence through the pump and through the oil discharge line 46 which, as shown in FIG. 1, extends through the storage vessel 12 and buoyancy chamber 20 to the swivel connection 24 on the mooring staple 22 from whence the oil flows to the transport vessel. It is not necessary for the oil discharge line 46 to pass through storage vessel 12 and buoyancy chamber 20. However, it is necessary that line 46 be connected to swivel type connector 24 on mooring staple 22. While the fill line 28 is being used as part of the discharge system, the surge tank 32 temporarily stores the incoming oil.

A second embodiment of the combination storage vessel and mooring staple is shown in FIG. 2. In this figure, parts corresponding to those shown in FIG. 1 are designated with the same reference numeral primed. As can be seen from FIG. 2, a buoyancy chamber 52 is provided within the storage vessel 12'. This buoyancy chamber is located in the top of the vessel and as mentioned previously must be of sufficient volume to provide buoyancy for the storage vessel 12 under all conditions. The connecting means between the mooring staple 22' and the storage vessel 12' is provided by buoy mooring lines 54. These lines are also utilized to support the oil suction and discharge hose 44. The main advantage to connecting the mooring staple 22' and the storage vessel 12' by mooring lines 54 rather than by the buoyancy chamber 20, as shown and described in connection with FIG. 1, is that a more flexible mooring staple can be provided. Since the storage vessel 12' is not fixed rigidly to the water bottom, it can oscillate vertically and horizontally under the influence of the positive and negative forces applied thereto by wave action. If the storage vessel 12' were rigidly connected to the bottom located mooring or pile 14 considerable strain would be applied not only to the rigid connecting means but also to the bottom located mooring or pile. The oscillation permitted by the use of the mooring lines has no adverse effect on the storage vessel itself or its contents.

Metering means may be provided both at the input and output of the storage vessel 12 in order to keep track of the amount of oil taken from the storage vessel as well as the amount put in. This would prevent overfilling the storage vessel and would also prevent the loading of water into the transport vessel 38 from the storage vessel 12.

The submerged storage vessel 12 and mooring facility 22 can easily be moved to a new site. After ballasting the storage vessel buoyancy chamber, a diver can disconnect the mooring lines 18 from connectors 16 at the mooring weight 14. Upon deballasting the buoyancy chamber, the vessel 12 will rise to the surface. The flotation of the vessel with respect to the surface can easily be controlled by controlling the buoyancy of the vessel itself. This would require a closing of opening 26. Accordingly, as the contents of the vessel 12 are pumped out, the vessel would become more buoyant and float higher on the surface so that it can easily be towed to a new site.

If the concrete block type of mooring is used rather than a piling driven into the water bottom and the storage vessel is of sufficient size, the mooring lines 18 do not have to be disconnected from connectors 16, since the full buoyancy condition of the vessel will be sufficient to float the mooring block for towing to a new site.

In order to provide an example of the sizes and dimensions involved, the criteria for a 20,000 barrel storage vessel have been calculated. Such a vessel having a spherical shape would be 60 feet in diameter. The net positive buoyancy would range from a minimum of 200,000 pounds to a maximum of 1,200,000 pounds. The minimum water depth for utilizing such a storage vessel would be approximately 170 feet whereas the maximum water depth would be approximately 600 feet.

Obviously, many modifications and variations of the invention as hereinabove set forth, may be made without departing from the spirit and scope thereof, and therefore, only such limitations should be imposed as are indicated in the appended claims.

I claim:

1. A submerged storage means for storing liquids in a body of water, said stored liquid having a density less than the water in which it is submerged and being substantially immiscible therewith, comprising a substantially entirely enclosed hollow storage vessel, a mooring means comprising a mooring member located on the bottom of said body of water and flexible cable means under tension interconnecting said mooring member and said storage vessel for preventing said storage vessel from rising above a predetermined depth intermediate between the floor of the body of water and the surface of the water, a rigid vertical column extending from said storage vessel to the surface of said body of water, said column including means for mooring a transport vessel thereto, said vertical column further including buoyancy means to maintain an upward force on said vessel thereby keeping tension on said mooring means to maintain said vessel at said predetermined depth, said vessel having a port near the bottom thereof providing for passage of the liquid in which the vessel is submerged, means for inserting into said vessel said less dense liquid to be stored, thereby diplacing from said vessel through said port a corresponding amount of the liquid in which the vessel is submerged, means for discharging said less dense liquid from said storage vessel thereby providing an inflow through said port of a corresponding amount of the liquid in which the vessel is immersed.

2. A subsea storage means for storing liquids having a density less than the sea water which it is submerged and being substantially immiscible therewith, comprising a substantially entirely enclosed hollow storage vessel having curved side surfaces for providing small resistance to the horizontal movements of the sea water, a mooring member located at the sea bottom, at least one flexible mooring line under tension attached at one end to said mooring member and at the other end to said storage vessel for mooring said vessel at a predetermined location below the water surface, a rigid vertical column extending from said storage vessel to the surface of said body of water, said column including means for mooring a transport vessel thereto, said vertical column further including buoyancy means to maintain an upward force on said vessel to keep said mooring lines under tension, said vessel having a port near the bottom thereof for the passage of the water therethrough, means for inserting less dense liquid to be stored into said vessel, thereby displacing water within said vessel through said port, said means for inserting including a pipe entering the bottom of said storage vessel and extending into the upper portion of said vessel, and discharge means for removing the stored liquid from said subsea storage vessel.

3. A submerged storage means and loading facility for storing liquids in a body of water for loading a transport vessel, said stored liquid having a density less than the water in which it is submerged and being substantially immiscible therewith, comprising a substantially entirely enclosed hollow storage vessel, a flexible mooring means under constant tension for preventing said storage vessel from rising above a predetermined depth intermediate between the floor of the body of water and the surface of the water, buoyancy means associated with said storage vessel to maintain an upward force on said storage vessel thereby keeping tension on said flexible mooring means to maintain said storage vessel at said predetermined depth, said storage vessel having a port near the bottom thereof providing for passage therethrough of the liquid in which the vessel is submerged, means for inserting into the upper portion of said vessel said less dense liquid to be stored, said means for inserting including a pipe entering the bottom of said storage vessel and extending upwardly to the upper portion of said vessel, thereby displacing from said storage vessel through said port a corresponding amount of the liquid in which the vessel is submerged, means for discharging said less dense liquid from the upper portion of said storage vessel thereby providing an inflow through said port of a corresponding amount of the liquid in which the vessel is submerged, a mooring buoy floating on the surface of the liquid in which the storage vessel is submerged, fluid transfer means connecting said mooring buoy to said submerged storage vessel, a coupling means located on said buoy for connecting said fluid transfer means for discharging said submerged storage vessel to said transport vessel.

4. Apparatus according to claim 3, wherein said coupling means is a swivel joint coupling means, said swivel joint coupling being adapted to receive a hose connection from said transport vessel, thereby allowing said transport vessel to maneuver while loading.

5. Apparatus according to claim 3, wherein said buoyancy means is a buoyancy chamber located in said connecting means between said storage vessel and said surface mooring buoy.

6. Apparatus according to claim 3, wherein said connecting means between said submerged storage vessel and said surface mooring buoy comprises at least one flexible cable.

7. A combination subsea storage means and loading facility for storing liquids for loading on a transport vessel, said stored liquids having a density less than the sea water in which the storage means is submerged and being substantially imiscible therewith, comprising a substantially entirely enclosed hollow storage vessel having curved side surfaces for offering small resistance to the horizontal movement of the sea water in which it is submerged, mooring means located at the sea bottom, flexible mooring means permitting horizontal and vertical movement of said storage vessel connecting said storage vessel to said mooring means and maintaining said storage vessel at a predetermined location intermediate between the floor of the sea and the surface of the water, buoyance means associated with said storage vessel to maintain an upward force on said storage vessel to keep said mooring lines taut, said storage vessel having a port near the bottom thereof for the passage of the sea water, buoyancy means associated with said storage vessel to maintain an upward force on said storage vessel having a port near the bottom thereof for the passage of the sea water in which it is submerged, pumping means remotely located from said storage vessel for inserting said less dense liquid to be stored into the upper portion of said vessel thereby displacing sea water within said vessel through said port, means connected to the upper portion of said storage vessel for discharging said less dense liquid from said storage vessel for discharging said less dense liquid from said storage vessel thereby providing a corresponding inflow through said port of said sea water, a mooring buoy floating on the sea surface, means connecting said mooring buoy to said submerged storage vessel, said means connecting said mooring buoy to said storage vessel including said buoyance means, a swivel joint coupling means located on said buoy, said storage vessel discharge means being connected to said swivel joint coupling means, said swivel joint coupling means being adapted to receive a hose connection from said transport vessel, thereby allowing said transport vessel to maneuver while loading.

References Cited

UNITED STATES PATENTS

| | | | |
|---|---|---|---|
| 1,201,051 | 10/1916 | Jack | 114—0.5 |
| 1,859,322 | 5/1932 | Wilson | 114—0.5 |
| 2,701,375 | 2/1965 | Ault | 9—8 |
| 2,731,168 | 1/1956 | Watts | 114—0.5 |

FOREIGN PATENTS 4,669,856  6/1937  Great Britain.

MILTON BUCHLER, *Primary Examiner.*

T. M. BLIX, *Assistant Examiner.*